March 27, 1962
D. F. PALAZZO ET AL
3,026,682
SEPARATION OF HYDROGEN AND METHANE
Filed Jan. 27, 1960
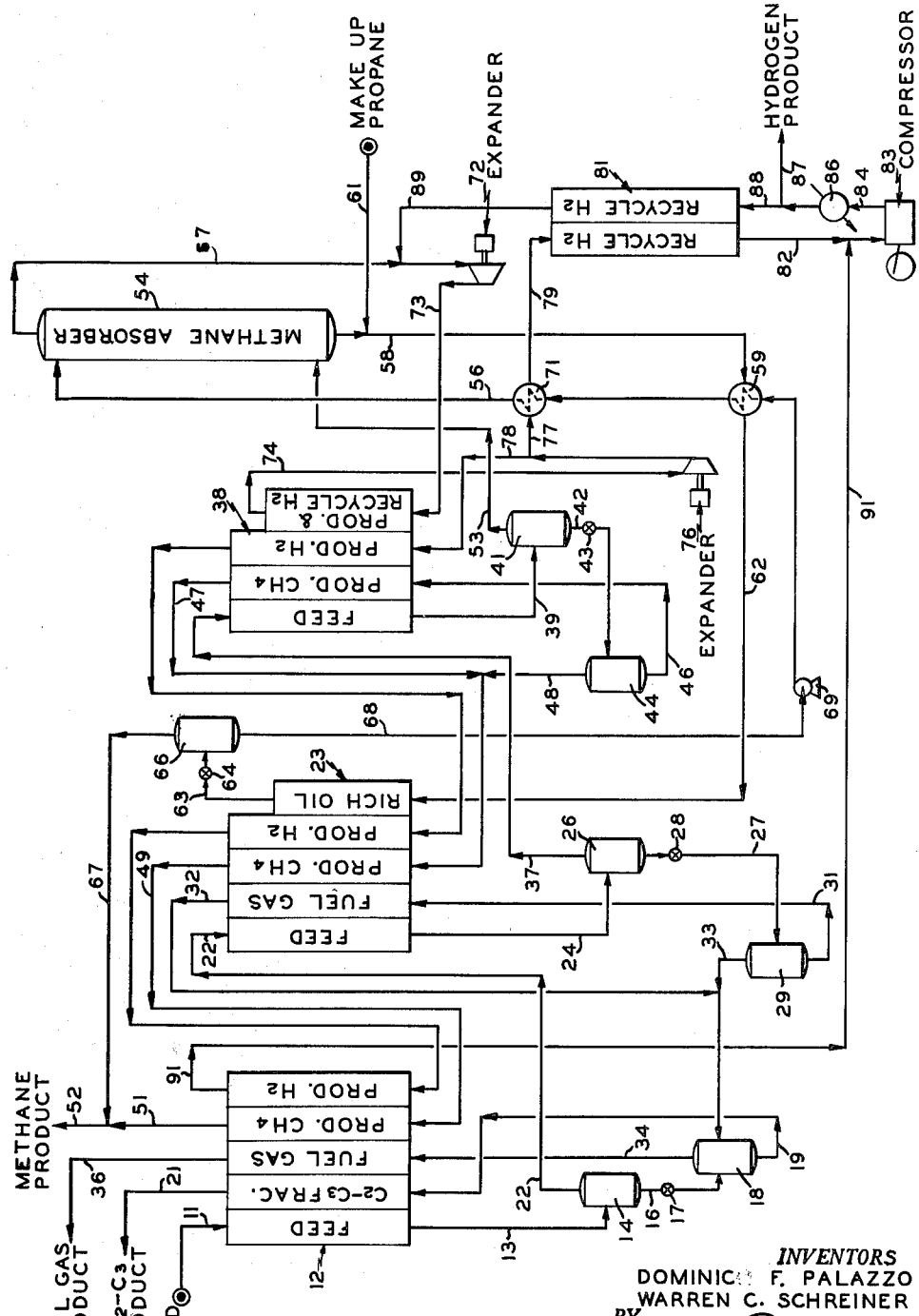
INVENTORS
DOMINIC F. PALAZZO
WARREN C. SCHREINER
BY
*S. H. Palmer*
*John L. Quinlan*
ATTORNEYS

United States Patent Office 3,026,682
Patented Mar. 27, 1962

3,026,682
SEPARATION OF HYDROGEN AND METHANE
Dominic F. Palazzo, Brooklyn, and Warren C. Schreiner, East Norwich, N.Y., assignors to The M. W. Kellogg Company, Jersey City, N.J., a corporation of Delaware
Filed Jan. 27, 1960, Ser. No. 4,902
11 Claims. (Cl. 62—17)

This invention relates to a low temperature gas separation process. One aspect of this invention relates to the separation of hydrogen and/or methane from mixtures of the same. Another aspect of this invention relates to a low temperature process for the recovery of hydrogen from mixtures comprising hydrogen, methane and heavier hydrocarbons. The present application is a continuation-in-part of our co-pending application Serial No. 548,631, filed November 23, 1955.

There is a growing demand in industry for large quantities of high purity hydrogen. Such processes as the production of alcohols from esters or aldehydes, amines from nitriles, and cycloparaffins from aromatics all require large amounts of high purity hydrogen which must be obtained at the lowest possible cost. In addition, hydrogen is used in the upgrading of cycle oils by hydrogenation and under some circumstances low cost high purity hydrogen is preferred for use in this type of process rather than the relatively impure hydrogen normally used.

With the advent of catalytic reforming a potentially large and cheap source of high purity hydrogen has become available. Many catalytic reforming processes, such as platinum reforming, produce large quantities of hydrogen-containing gases as by-products. A number of other conventional refinery processes produce by-product gases containing appreciable amounts of hydrogen. Unfortunately, the hydrogen-containing gases produced in the various refinery processes contain considerable quantities of methane and heavier hydrocarbons which must be removed if hydrogen of sufficient purity is to be obtained.

One method of recovering hydrogen from such mixtures of hydrogen and hydrocarbons is to lower the temperature of the mixture so that the hydrocarbons condense. Cooling and removing condensed hydrocarbons is effective to a certain extent; however, some methane always remains and, for many applications, this methane must be removed if hydrogen of a desired degree of purity is to be obtained. If a hydrogen-methane mixture is cooled to a temperature just above the freezing point of methane, about 2 to about 10 mol percent, more usually about 2 to about 6 mol percent, methane remains uncondensed because of the methane partial pressure. Since, for many applications, hydrogen having a purity of 99 mol percent or more is desired, it is necessary to remove this residual methane in order to obtain hydrogen of the required degree of purity. In order to remove this residual methane by condensation it would be necessary to cool the hydrogen and methane mixture to below the freezing point of methane and under these circumstances considerable difficulty would be experienced in removing the deposits of solid methane which would be formed. Previously, it has been known to subject these mixtures of hydrogen and methane to countercurrent contact with liquid nitrogen whereby the methane is absorbed in the nitrogen. This process has been satisfactory when used to produce hydrogen for use in ammonia production. It is not satisfactory, however, for many other uses because the hydrogen recovered from such a process is contaminated with vaporized nitrogen. It can be seen, therefore, that previous methods for the low temperature recovery of hydrogen from mixtures of hydrogen and hydrocarbons have not produced sufficiently pure hydrogen for many applications.

It is an object of the invention to provide an improved process for the separation of hydrogen and/or methane from mixtures of the same.

It is another object of this invention to provide an improved process for the purification of hydrogen contaminated with methane.

It is a further object of the invention to provide an improved process for the recovery of hydrogen from mixtures of hydrogen and hydrocarbons.

Another object of this invention is to provide an improved low-temperature process for the recovery of hydrogen from mixtures of hydrogen and normally gaseous hydrocarbons.

Another object of this invention is to provide an improved process for the low-temperature purification of hydrogen produced as a by-product of conventional refining operations.

One aspect of the invention relates to a process for the separation of methane and hydrogen from a mixture containing the same which comprises contacting said mixture with a liquefied stream of a normally gaseous hydrocarbon whereby methane is absorbed by said hydrocarbons.

Another aspect of the invention relates to a process for the recovery of hydrogen from a mixture comprising hydrogen, methane, and heavier hydrocarbons in which said mixture is cooled, thereby condensing hydrocarbon impurities, hydrogen contaminated with methane is separated and withdrawn, methane is removed from the separated hydrogen by countercurrently contacting said separated hydrogen with a liquefied stream of a normally gaseous hydrocarbon and relatively pure hydrogen is recovered as a product of the process.

Removal of methane by absorption from the gaseous mixture containing hydrogen and methane in accordance with the invention, is normally accomplished at temperatures between about −257° F. and about −296° F., more usually between about −275° F. and about −295° F. Temperatures below the boiling point of methane at the absorption pressure are preferred since it is usually both possible and desirable to remove considerable quantities of methane by condensation prior to absorbing the residual methane with the liquid, normally gaseous hydrocarbon. On the other hand, temperatures below the freezing point of methane are preferably avoided because of the difficulties of handling solid methane deposits. Pressures of about 100 to about 500 p.s.i.a. for the absorption step are normally maintained while practicing the invention, although the invention is not limited to these pressures. Substantial superatmospheric pressures are used in connection with the invention for two principal reasons: first, product gases may be expansion cooled and their refrigeration recovered so as to lessen or completely eliminate the need for extraneous refrigerants and second, as the pressure of the hydrogen-methane mixture is increased, the temperature at which methane condenses from the mixture is also increased thereby reducing required refrigeration. It has been found, however, that processing a hydrogen-methane mixture above about 300 p.s.i.a. affords little advantage because above about this pressure there is little increase in the temperature at which methane condenses with rising pressure. It is, therefore, preferred to employ operating pressures in the absorption step of between about 100 and about 300 p.s.i.a. Choice of a particular operating pressure is made by balancing the factors for high pressure, namely higher temperatures and greater expansion refrigeration available, and lower pressure, namely less costly equipment.

In general, any normally gaseous hydrocarbon which is in the liquid state is suitable for use in absorbing methane according to the invention. Under the operating conditions normally used, propane, propylenes, ethane, and ethylene are suitable in this respect. Propane is usually preferred because of its low freezing point, cost, and the ease with which it is regenerated after use by simple heating and flashing without excessive attendant vaporization of the absorbent liquid.

The absorption medium which is used to absorb methane from the hydrogen becomes less effective for this purpose as it absorbs larger quantities of methane and hence should be treated for the removal of this methane if it is to be used further to absorb methane from the hydrogen. This is conveniently accomplished by continuous, countercurrent contact in an absorption tower. The high purity hydrogen is withdrawn from the upper portion of the absorption tower while the absorption medium containing absorbed methane is withdrawn from the lower portion of the absorption tower, purged of absorbed methane, and returned to the tower for further use. A highly efficient and convenient way of regenerating the rich absorbent involves stripping the rich absorbent of the absorbed methane in a separate stripping tower using a portion of the product hydrogen stream as the stripping gas. Unfortunately, however, such a regeneration has the disadvantage of consuming some of the valuable hydrogen product, thereby reducing the net production of high purity hydrogen. The present process is capable of purifying hydrogen to levels as high as about 99.6 mol percent without using valuable hydrogen product as a stripping medium for regeneration. Purities of about 95 to about 99.6 mol percent hydrogen are sufficiently high for many applications. In terms, then, of efficiency, the present process is highly advantageous since it consumes none of the product hydrogen in regenerating the rich absorbent. In accordance with the present invention, regeneration of the absorption medium is obtained by heating the rich absorbent slightly and reducing its pressure under controlled conditions, thereby flashing off substantial amounts of the absorbed methane. The unvaporized liquid can then be pumped up to the pressure of the absorption tower and returned for further use.

Regeneration of rich absorption medium by controlled heating and flashing only requires equipment for effecting separation of flashed vapor and unvaporized liquid, such as a simple drum, rather than a separate stripping tower as required in the regeneration process first described. Controlled heating of the rich absorbent is conducted efficiently by indirectly heat exchanging this stream with warmer streams which must be cooled, such as the feed gas stream and the regenerated lean absorbent stream. Therefore, for hydrogen purification processes requiring hydrogen purities of about 99.6 percent or less, it is preferred to regenerate the absorption medium by heating and flashing.

According to the invention, the rich absorption medium is flashed to a pressure of between about 14.7 p.s.i.a. and about 50 p.s.i.a., although operation of a flash zone is not limited to these pressures. The pressure to which rich absorbent is flashed must be sufficiently low to permit vaporization and separation of absorbed methane but should not be so low as to permit substantial vaporization of the absorption medium.

Removal of absorbed methane from the absorption medium in the flash zone, maintained at the usual pressures described above, is preferably carried out at temperatures of about −125° F. to about −250° F., more usually at about −175° F. to about −225° F. The temperature in the flash zone should not, of course, be high enough to cause substantial vaporization of the absorption medium.

Since for a given temperature and pressure in the flash zone, the temperature of the rich absorption medium prior to its reduction in pressure and at the elevated pressure of the absorption tower is fixed and usually substantially warmer than the temperature of the rich liquid withdrawn from the absorption tower, it is usually necessary to warm the rich absorption medium prior to reducing its pressure. Warming of the absorption medium containing absorbed methane can be conveniently accomplished by contacting it in indirect heat exchange relationship with warmer absorption medium which has already been regenerated or it can be accomplished by utilizing the cold rich absorption medium in supplying part of the cooling duty needed to cool the incoming feed stream at various stages of the process or both expedients can be used. The use of both expedients is preferred as it is desirable in warming the rich absorption medium to recover its "cold" for use elsewhere in the overall process.

If the mixture of gas from which hydrogen is to be recovered contains hydrocarbons heavier than methane or contains large amounts of methane, it is desirable to remove as much of the hydrocarbons as possible by condensation prior to contacting the methane-hydrogen mixture with the absorption medium. Frequently, the original gas mixture will contain appreciable amounts of saturated and unsaturated normally gaseous hydrocarbons as well as hydrogen and methane and it will be desirable to separate individual constituents or groups of constituents in connection with the hydrogen purification. Such gas mixtures, as refinery gases, are frequently available at relatively high temperatures, and it is usually desirable to effect the condensation of the hydrocarbons by cooling the original feed in a heat exchanger or series of heat exchangers in which the cooling duty is supplied in whole or in part by the cold hydrogen product and separated hydrocarbons. In a preferred embodiment of the invention, cold hydrogen product and cold separated hydrocarbons are used to supply the cooling duty needed to condense hydrocarbons present in the original feed gas. By appropriate stagewise cooling of the feed with separation of condensed hydrocarbons between the cooling stages, selected groups of hydrocarbon constituents are separated and recovered. Because the feed gas is cooled to temperatures much below the freezing point of water, it is preferred to dry the feed gas prior to cooling so as to avoid formation of ice deposits in the cooling equipment. Drying of the feed gas when it contains water avoids the need for reversing heat exchangers or other steps to remove ice deposits otherwise formed and required to be removed if the process is to operate continuously.

Regardless of whether the hydrogen purification process includes special features whereby individual hydrocarbon constituents or groups of constituents are separately recovered, it is necessary to cool the hydrogen-methane gas to about or below the temperature of the absorber as efficiently as possible. Likewise, it will usually be necessary to cool the lean absorption medium from the flash regeneration step prior to returning the lean absorbent to the absorption tower for reuse in absorbing methane. The cooling requirements of the process may be met in any suitable way but, for reasons of efficiency, it is preferred to recover the cold of the hydrogen and/or hydrocarbon products, at their initial pressures or after expansion or both, by appropriate indirect heat exchange between these products and the hydrogen feed and lean absorbent streams. One highly efficient sequence of heat exchange steps is discussed below in connection with an example of a preferred embodiment of the invention.

For a better understanding of the invention, reference should be had to the following detailed description and discussion read in conjunction with the accompanying drawing which is a diagrammatic illustration in elevation of a suitable arrangement of apparatus for carrying out a preferred embodiment of the invention.

In the drawing, 18,091 pounds per hour of a refinery gas having the composition shown in column 1 of the table enter as feed through conduit 11 at a pressure of 315 p.s.i.a. and a temperature of 65° F. The feed passes to multi-passage heat exchanger 12 wherein the feed is cooled to −120° F. by countercurrent indirect heat exchange with four cold product streams: ethylene-propylene, fuel gas, methane, and hydrogen, all as hereinafter more fully described. From exchanger 12, the chilled feed passes through conduit 13 to a separation drum 14 in which the hydrocarbons condensed by the cooling of the feed in exchanger 12 are separated. The hydrocarbon condensate separated in drum 14 is withdrawn through conduit 16, flashed across valve 17, and separated into liquid and vapor fractions in separation drum 18 which operates at —158° F. and 72 p.s.i.a. The liquid fraction separated in drum 18 is withdrawn through conduit 19 and used to supply cooling duty to the feed in exchanger 12 as the aforesaid cold product ethylene-propylene stream. The ethylene-propylene product, having the composition given in colmn 2 of the table, is withdrawn from exchanger 12 through conduit 21 at a rate of 3,437 pounds per hour, delivered at 28° F. and 70 p.s.i.a.

After separation of condensed hydrocarbons in drum 14, the vaporous feed is passed through conduit 22 to multi-passage heat exchanger 23 wherein the feed is further cooled to —190° F. by indirect countercurrent heat exchange with fuel gas, product methane, product hydrogen, and rich oil, all obtained as hereinafter more fully described. From exchanger 23, the further chilled feed passes in conduit 24 to a separation drum 26 in which the hydrocarbons condensed by the cooling of the feed in exchanger 23 are separated. Hydrocarbon condensate from drum 26 is withdrawn in conduit 27, flashed across valve 28, and separated into liquid and vapor fractions in separation drum 29 operating at —214° F. and 74 p.s.i.a. The hydrocarbon condensate separated in drum 29 is passed in conduit 31 and used to cool the feed in exchanger 23 as the aforesaid fuel gas. Fuel gas is heated in exchanger 23 to —165° F., withdrawn through conduit 32, combined with the vapor fraction withdrawn through conduit 33 from drum 29, and passed to drum 18. The vapor fraction in drum 18 which comprises gas flashed from the condensate in drum 14 and the gas resulting from vaporizing condensate from drum 26 is withdrawn from drum 18 through conduit 34 and used to supply cooling duty to the feed in exchanger 12 as the aforesaid cold product fuel gas. The fuel gas product, having the composition given in column 3 of the table, is withdrawn from exchanger 12 through conduit 36 at a rate of 5,677 pounds per hour, delivered at 28° F. and 70 p.s.i.a.

The further chilled feed gas separated in drum 26 is withdrawn through conduit 37 and still further chilled in multi-passage heat exchanger 38 by indirect countercurrent contact with three streams: a product methane stream, a product hydrogen stream, and a combined product and recycled hydrogen stream, all as hereinafter more fully described. In exchanger 38 the feed is cooled to about —270° F. thereby condensing substantial amounts of the methane which may be condensed by cooling without freezing some methane and producing troublesome methane deposits. The highly chilled feed from exchanger 38 is passed in conduit 39 to a separation drum 41 wherein the condensed methane is separated. Methane condensate separated in drum 41 is withdrawn through conduit 42, flashed across valve 43, and separated into liquid and vapor fractions in separation drum 44 which operates at —271° F. and 22 p.s.i.a. The liquid methane fraction separated in drum 44, is passed in conduit 46 to exchanger 38 as the aforesaid product methane stream. This product stream is vaporized and warmed by indirect heat exchange with the feed in exchanger 38. Product methane is recovered as a vapor in conduit 47 from exchanger 38 and in conduit 48 from drum 44. Combined vaporous product methane at —242° F. is heated to —165° F. by indirect heat exchange with feed as aforesaid in exchanger 23 and further heated after passage in conduit 49 to 28° F. by indirect heat exchange with feed as aforesaid in exchanger 12. Product methane at 16 p.s.i.a. having the composition given in column 4 of the table, is withdrawn from exchanger 12 through conduits 51 and 52 and delivered as a product at a rate of 8,198 pounds per hour.

From the foregoing it is seen that cooling requirements for the feed are supplied in part by flashing condensed hydrocarbons and passing them countercurrently to incoming feed, thereby recovering the substantial refrigeration available in the relatively high pressure, condensed hydrocarbons. When these flashes are carried out, however, some vapor is generated before the hydrocarbon can be introduced into the multi-passage heat exchangers. To avoid the possibility, however remote, that there might be maldistribution of liquid and vapor among the multiple passages manifolded together in the exchangers for each stream, all flashes are carried out in drums and liquid and vapor are separated.

Thus, as is the case with fuel gas condensate in drum 26 and product methane condensate in drum 41 the liquids are flashed and the resulting liquid is passed through the exchanger and recombined with the small amount of flash vapor. The use of drums 29 and 44 is solely precautionary and applies only to multi-passage heat exchangers where maldistribution is a possibility. With some multi-passage heat exchangers maldistribution is not a problem and the separations effected in drums 29 and 44 are unnecessary. Flashing of the hydrocarbon condensate separated in drum 14 into drum 18 accomplishes the above purpose as well as effecting a separation of ethylene-propylene from fuel gas, a particular requirement of the process of this example. It should be apparent that where a single hydrocarbon product is desired or where a different product distribution than obtained in the example is desired, these objectives are readily achieved by proper control of the extent of feed cooling in each exchanger in the sequence, the pressure to which hydrocarbon condensate is flashed, and subsequent combination of flashed products.

Following removal of the condensed hydrocarbons the feed stream, which now comprises about 95 mol percent hydrogen and about 5 mol percent methane, passes through conduit 53 to an absorption tower 54. In absorption tower 54 the feed introduced through conduit 53 is countercurrently contacted with liquid propane introduced through conduit 56. Substantially all of the residual methane is absorbed by the liquid propane and 779 pounds per hour of hydrogen product comprising about 99.0 mol percent hydrogen and about 1.0 mol percent methane are withdrawn from absorption tower 54 through conduit 57. Absorption tower 54 is operated at a pressure of 300 p.s.i.a. with a bottom temperature of —254° F. and a top temperature of —263° F.

Propane containing absorbed methane is withdrawn from absorption tower 54 as a rich oil stream and passed in conduit 58 at a rate of 3,850 pounds per hour to heat exchanger 59. To balance the small losses of propane which occur in the circulating system, 20 pounds per day of make-up propane is added to the rich oil stream in conduit 59 through conduit 61. In heat exchanger 59 the rich oil stream is heated from —254° F. to —215° F. by indirect heat exchange with warm regenerated propane or lean oil. Partly warmed rich oil from exchanger 59 passes in conduit 62 and is further warmed to —176° F. by indirect heat exchange with feed in exchanger 23, as aforesaid.

After giving up refrigeration to regenerated liquid propane or lean oil and to feed, the warmed rich oil is passed from exchanger 23 through conduit 63, flashed across valve 64 and separated into flash methane gas and regenerated liquid propane or lean oil in separation drum 66. Drum 66 operates at 16 p.s.i.a. and —203° F. under which conditions substantial amounts of the absorbed methane in the liquid propane are vaporized without any appreciable vaporization of liquid propane. This produces a lean oil or unvaporized propane fraction in drum 66 which is sufficiently low in methane for further use in purifying hydrogen without the necessity of using stripping gas. Because of the low pressure of the flash methane gas, it is removed directly from the process to conduit 52 without further use as a refrigerant through conduit 67. This affords no refrigeration problem since the flash methane stream is a very small stream with little heat capacity.

The lean oil or regenerated liquid propane is withdrawn from drum 66 through conduit 68, pumped up to 300 p.s.i.a. by pump 69, cooled in indirect heat exchangers 59 and 71 against cold rich oil and expanded recycle hydrogen to −280° F. and returned to tower 54 for further use as absorbent through conduit 56.

Substantial portions of the refrigeration required by the process in cooling the feed and the lean oil are derived by various heat exchanges between these streams and the product hydrogen stream. Thus, product hydrogen withdrawn from absorption tower 54 through conduit 57 is combined with an equal amount of recycle hydrogen obtained as hereinafter described. The combined stream is expansion-cooled to −295° F. and 127 p.s.i.a. in expander 72 which is an expansion engine of the turbo-expander type. Power is generated by the expansion. The expansion-cooled hydrogen stream passes from expander 72 through conduit 73 to the cold end of exchanger 38 where it yields refrigeration to the feed gas. The feed gas is thus chilled to a temperature below that of unexpanded product hydrogen but not so low as to cause freezing of methane. The combined hydrogen stream is expanded only enough to cool it to a temperature at which it may be efficiently heat exchanged with the feed. Further expansion of the combined hydrogen stream is undesirable because the resultant gas would be so cold as to chill feed to the point of precipitation of solid methane deposits.

The combined product and recycle hydrogen stream used to cool feed in exchanger 38 is withdrawn through conduit 74 at −255° F. and further expanded to 48 p.s.i.a. and −295° F. in expander 76 which, like expander 72, is an expansion engine of the turbo-expander type linked to power recovery means or dissipation. Further expanded hydrogen from expander 76 is divided equally into a product hydrogen stream in conduit 78 and a recycle hydrogen stream in conduit 77.

Recycle hydrogen from expander 76 in conduit 77 is used to cool lean oil in exchanger 71 and is itself warmed to −266° F. Expanded recycle hydrogen passes from exchanger 71 in conduit 79 to multi-passage heat exchanger 81 wherein the expanded recycle hydrogen is heated to 102° F. by indirect heat exchange with compressed recycle hydrogen. The expanded recycle hydrogen heated in exchanger 81 is withdrawn in conduit 82 and combined with warm expanded hydrogen product, obtained as hereinafter described. This combined stream is compressed to a pressure of 315 p.s.i.a. in compressor 83 which discharges through conduit 84 to a water cooler 86 in which compressed hydrogen is cooled to 110° F. Cooled compressed hydrogen is again divided into equal streams: one portion delivered at a rate of 779 pounds per hour through conduit 87 as the final hydrogen product of the process, having the composition given in column 5 of the table; and the other portion delivered as recycle to exchanger 81 through conduit 88. The compressed recycle hydrogen is cooled to −158° F. in exchanger 81 by indirect heat exchange with cold expanded recycle hydrogen and is delivered through conduit 89 to combine with hydrogen from the absorption tower 54 in conduit 57.

The expanded hydrogen product stream at −295° F. and 48 p.s.i.a. from expander 76 and in conduit 78 is used to cool the feed gas by successive countercurrent indirect heat exchange in exchangers 38, 23 and 12. In the course of this cooling, the hydrogen product stream is successively heated to −243° F., −165° F. and 28° F. After yielding its refrigeration to the feed gas, the product hydrogen stream is recovered from exchanger 12 through conduit 91 and delivered to compressor 83. Of course, product hydrogen from exchanger 12 can be delivered from the process at 40 p.s.i.a. Since, however, it is desired in this instance to recover product hydrogen at the same pressure as is maintained in absorber tower 54, a single compressor 83 functions in the dual capacity of compressing the hydrogen product and the expanded recycle hydrogen.

Superimposition of hydrogen recycle on the basic hydrogen product flow, which is constant off absorption tower 54 in conduit 57 and in conduits 78, 91 and 87, augments efficiently the refrigeration available from the hydrogen product at the critical lower temperature levels of the process. The amount of hydrogen recycled is, of course, influenced by the relative amounts of refrigeration required by the process and that available in the product hydrogen. As the hydrogen concentration in the original feed gas decreases, the refrigeration available from expansion cooling of the hydrogen product likewise decreases. Recycling of a portion of the hydrogen product through a heat exchange circuit of expansion and recompression affords an efficient input of refrigeration to processes where the hydrogen content of the original feed is so low as to afford insufficient hydrogen product in combination with condensed hydrocarbons to provide the refrigeration requirements of the process.

Various changes may be made in the details of operation of the invention without departing from the scope or sacrificing the advantages thereof. It is understood that the invention is limited only by the scope of the appended claims.

*Table*

| Column Component | 1, mol percent | 2, mol percent | 3, mol percent | 4, mol percent | 5, mol percent |
|---|---|---|---|---|---|
| Hydrogen | 27.8 | | 0.6 | 1.2 | 99.0 |
| Methane | 64.9 | 18.3 | 95.1 | 98.4 | 1.0 |
| Ethylene | 2.4 | 17.4 | 3.8 | 0.3 | |
| Ethane | | 0.1 | | | |
| Propylene | 4.6 | 60.2 | 0.5 | | |
| Propane | 0.3 | 4.0 | | | |
| Carbon Monoxide | trace | | | 0.1 | |
| Total | 100.0 | 100.0 | 100.0 | 100.0 | 100.0 |

We claim:

1. The process for the separation of hydrogen from a mixture containing methane and at least 90 mol percent hydrogen which comprises contacting said mixture with a liquefied stream of normally gaseous hydrocarbon at an elevated pressure in an absorption zone whereby methane is absorbed by said hydrocarbon, separating purified hydrogen of at least 95 mol percent purity and liquefied hydrocarbon containing absorbed methane, passing said liquefied hydrocarbon containing absorbed methane from said absorption zone to a zone of reduced pressure, separating an overhead fraction comprising vaporized methane and a bottoms fraction comprising liquefied hydrocarbon in said zone of reduced pressure and returning liquefied hydrocarbon from said zone of reduced pressure without contacting the same with a stripping medium to said absorption zone as said liquefied stream of normally gaseous hydrocarbon.

2. The process of claim 1 in which said normally gaseous hydrocarbon is propane.

3. The process for the recovery of a gas comprising at least about 95 mol percent hydrogen from a gaseous mixture comprising hydrogen, methane, and heavier normally gaseous hydrocarbons which comprises cooling said mixture whereby at least a portion of said hydrocarbons is condensed, removing said condensed hydrocarbons, further cooling said mixture whereby a further portion of said hydrocarbons is condensed, removing said further portion of condensed hydrocarbons thereby leaving a gaseous mixture comprising at least 90 mol percent hydrogen contaminated with methane, countercurrently contacting the last-mentioned gaseous mixture with a liquefied stream of normally gaseous hydrocarbon at an elevated pressure in an absorption zone whereby methane is absorbed, separating purified hydrogen and liquefied hydrocarbon containing absorbed methane, passing said liquefied hydrocarbon containing absorbed methane to a zone of reduced pressure, separating an overhead fraction comprising vaporized methane and a bottoms fraction comprising liquefied hydrocarbon in said zone of reduced pressure and returning liquefied hydrocarbon from said zone of reduced pressure without contacting the same with a stripping medium to said absorption zone as said liquefied stream of normally gaseous hydrocarbon.

4. The process of claim 3 in which said liquefied stream of normally gaseous hydrocarbon is propane.

5. The process for the separation of hydrogen from a mixture containing methane and at least 90 mol percent hydrogen which comprises contacting said mixture with a liquefied stream of normally gaseous hydrocarbon at an elevated pressure between about 100 and 300 p.s.i.a. in an absorption zone whereby methane is absorbed by said hydrocaron, separating purified hydrogen of at least 95 mol percent purity and liquefied hydrocarbon containing absorbed methane, passing said liquefied hydrocarbon containing absorbed methane to a zone of reduced pressure between about 14.7 p.s.i.a. and about 50 p.s.i.a., separating an overhead fraction comprising vaporized methane and a bottoms fraction comprising liquefied hydrocarbon in said zone of reduced pressure and returning liquefied hydrocarbon from said zone of reduced pressure without contacting the same with a stripping medium to said absorption zone as said liquefied stream of normally gaseous hydrocarbon.

6. The process of claim 5 in which said normally gaseous hydrocarbon is propane.

7. The process for the recovery of a gas comprising at least about 95 mol percent hydrogen from a gaseous mixture containing hydrogen and methane which comprises cooling said mixture whereby a portion of said methane is condensed, removing condensed methane, countercurrently contacting said cooled gaseous mixture with a liquefied stream of normally gaseous hydrocarbon at an elevated pressure in an absorption zone whereby methane is absorbed, separating purified hydrogen and liquefied hydrocarbon containing absorbed methane, heating said liquefied hydrocarbon containing absorbed methane by indirect heat exchange with said gaseous mixture to accomplish a portion of the aforesaid cooling thereof, passing said heated liquefied hydrocarbon containing absorbed methane to a zone of reduced pressure, separating an overhead fraction comprising vaporized methane and a bottoms fraction comprising liquefied hydrocarbon in said zone of reduced pressure, and returning liquefied hydrocarbon from said zone of reduced pressure to said absorption zone as said liquefied stream of normally gaseous hydrocarbon.

8. The process for the recovery of a gas comprising at least about 95 mol percent hydrogen from a gaseous mixture containing hydrogen and methane which comprises cooling said mixture whereby a portion of said methane is condensed, removing condensed methane, countercurrently contacting said cooled gaseous mixture with a cold liquefied stream of normally gaseous hydrocarbon at an elevated pressure in an absorption zone whereby methane is absorbed, separating purified hydrogen and liquefied hydrocarbon containing absorbed methane, heating said liquefied hydrocarbon containing absorbed methane by indirect heat exchange successively with a warm liquefied stream of normally gaseous hydrocarbon obtained as described below and with said gaseous mixture to accomplish a portion of the aforesaid cooling thereof, passing said heated liquefied hydrocarbon containing absorbed methane to a zone of reduced pressure, separating an overhead fraction comprising vaporized methane and a bottoms fraction comprising warm liquefied hydrocarbon in said zone of reduced pressure and returning said warm liquefied fraction from said zone of reduced pressure, after said indirect heat exchange, to said absorption zone as said cold liquefied stream of normally gaseous hydrocarbon.

9. The process of claim 8 in which said normally gaseous hydrocarbon is propane, said elevated pressure is between about 100 and 300 p.s.i.a., and said reduced pressure is between about 14.7 p.s.i.a. and 50 p.s.i.a.

10. The process for the recovery of a gas comprising at least about 95 mol percent hydrogen from a gaseous mixture containing hydrogen and methane which comprises cooling said mixture whereby a portion of said methane is condensed, removing condensed methane, countercurrently contacting said cooled gaseous mixture with a cold liquefied stream of normally gaseous hydrocarbon at an elevated pressure in an absorption zone whereby methane is absorbed, separating purified hydrogen and liquefied hydrocarbon containing absorbed methane, heating said liquefied hydrocarbon containing absorbed methane by indirect heat exchange successively with a warm liquefied hydrocarbon fraction obtained as described below and with said gaseous mixture to accomplish a portion of the aforesaid cooling thereof, passing said heated liquefied hydrocarbon containing absorbed methane to a zone of reduced pressure, separating an overhead fraction comprising vaporized methane and a bottoms fraction comprising warm liquefied hydrocarbon in said zone of reduced pressure, cooling said warm liquefied fraction from said zone of reduced pressure first by said indirect heat exchange with said liquefied hydrocarbon containing absorbed methane and further by indirect heat exchange with expanded purified hydrogen, and returning said cooled liquefied fraction to said absorption zone as said cold liquefied stream of normally gaseous hydrocarbon.

11. The process for the recovery of a gas comprising at least about 95 mol percent hydrogen from a gaseous mixture containing hydrogen and methane which comprises cooling said mixture to a temperature of about −257° F. to about −296° F. whereby a portion of said methane is condensed, removing condensed methane, countercurrently contacting said cooled gaseous mixture with liquefied propane at a pressure between about 100 p.s.i.a. and 500 p.s.i.a. in an absorption zone whereby methane is absorbed, separating purified hydrogen and liquefied propane containing absorbed methane, passing said liquefied propane containing absorbed methane to a flash zone maintained at a reduced pressure of about 14.7 p.s.i.a. to about 50 p.s.i.a. and a temperature of about −125° F. to about −250° F., separating vaporized methane and unvaporized propane in said flash zone, and returning unvaporized propane from said flash zone to said absorption zone as said liquefied propane.

References Cited in the file of this patent

UNITED STATES PATENTS

| | | |
|---|---|---|
| 2,321,666 | Felbeck | June 15, 1943 |
| 2,535,148 | Martin et al. | Dec. 26, 1950 |
| 2,603,310 | Gilmore | July 15, 1952 |
| 2,685,941 | Kassel | Aug. 10, 1954 |
| 2,689,624 | Davis | Sept. 21, 1954 |
| 2,777,305 | Davidson | Jan. 15, 1957 |
| 2,804,488 | Cobb | Aug. 27, 1957 |